UNITED STATES PATENT OFFICE.

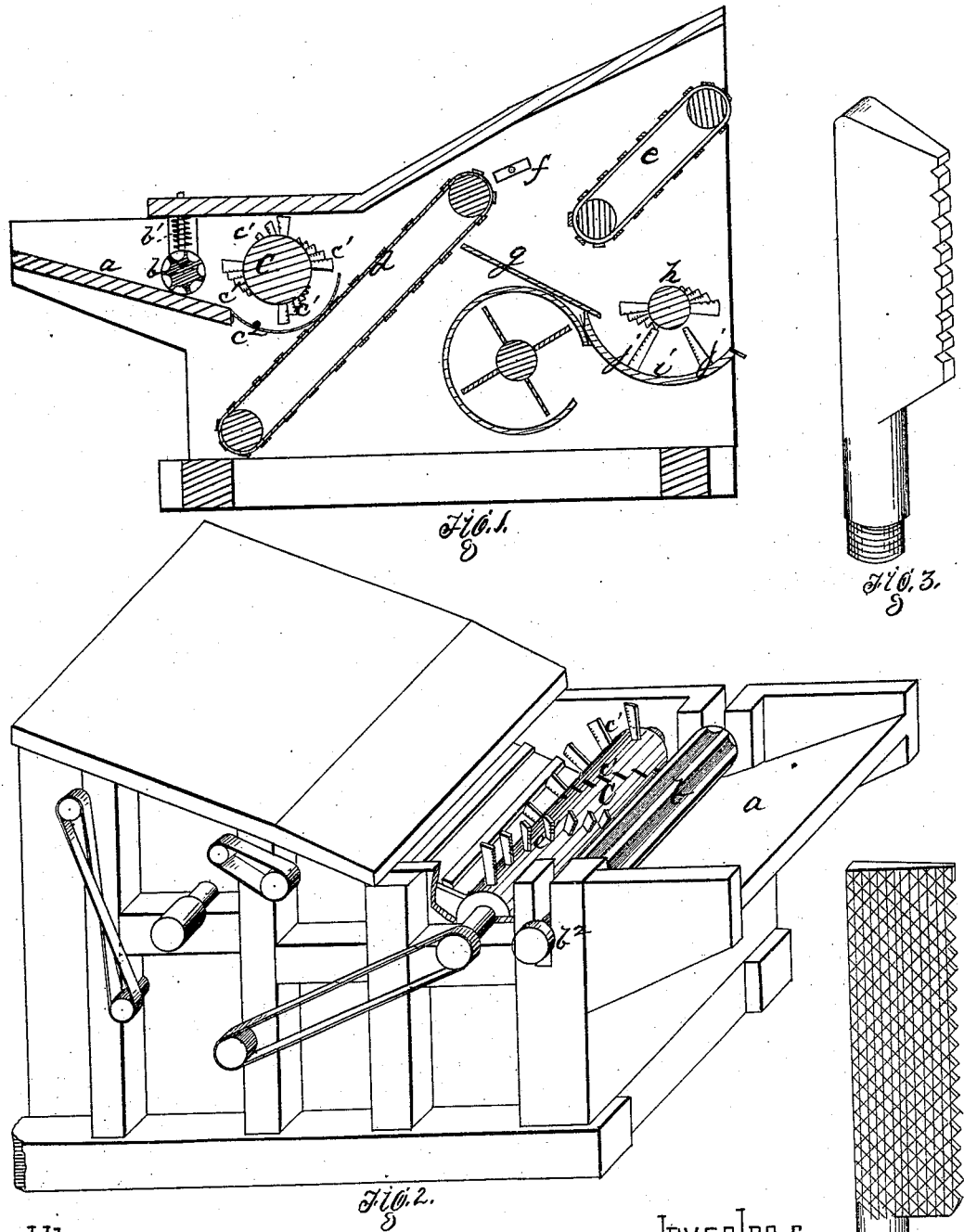

EDWIN R. JONES, OF MOOREFIELD, OHIO, AND JOHN W. GRUBBS, OF CANNONSBURG, PENNSYLVANIA.

IMPROVEMENT IN CLOVER THRASHER AND HULLER.

Specification forming part of Letters Patent No. 211,472, dated January 21, 1879; application filed September 9, 1878.

*To all whom it may concern:*

Be it known that we, EDWIN R. JONES, of Moorefield, Harrison county, Ohio, and JOHN W. GRUBBS, of Cannonsburg, in the county of Washington and State of Pennsylvania, have invented a new and useful Improvement in Machines for Thrashing Grain and Hulling Clover and other Seeds; and we do hereby declare the following to be a full, clear, and exact description thereof, reference being had to the accompanying drawing, forming part of this specification, in which—

Figure 1 is a longitudinal vertical section of a machine embodying our invention. Fig. 2 is a perspective view, parts of the machine being broken away to show the thrashing mechanism. Figs. 3 and 4 are views of the teeth used on the cylinders, &c.

Like letters refer to like parts wherever they occur.

Our invention relates to the construction of machinery for thrashing grain and hulling clover and other seeds; and consists in forming the thrashing-teeth wedge-shaped in cross-section, with smooth sides and serrated upon the front edges; in combining a cylinder armed with such teeth with a smooth concave or one devoid of teeth; and in specific combinations of the several elements, as will hereinafter more fully appear.

The object of our invention is to produce a machine so constructed and operating that it will effectually thrash the grain without material injury to either straw or grain, can be operated by unskilled labor without liability of clogging, and which will run light or require comparatively little power.

We will now proceed to describe our invention so that others skilled in the art to which it appertains may apply the same.

In the drawing, $a$ indicates the usual feed board or table, on which the grain is placed while feeding it into the machine. At the end of table or feed-board $a$ we arrange a longitudinally-corrugated feed-roll, $b$, journaled in suitable boxes and provided with springs $b^1$, (or weights or other equivalent mechanism,) which will allow the roll to rise sufficiently far to admit the desired quantity of grain, but not sufficient to admit an amount of grain which would choke the thrashing-cylinder, said mechanism being also gaged or adjusted to give the desired pressure to feed effectively and yet prevent the thrashing-cylinder from drawing the straw from the bite of the feed-roll.

On one or both ends of the feed-roll, as preferred, are pulleys $b^2$, of such size as to drive the said roll at a much less speed than the thrashing-cylinder—say, at one-half the speed.

C indicates the thrashing-cylinder, provided with a series of teeth, $c^1$, preferably arranged in spiral lines around the cylinder. These teeth are serrated or notched on their front edges, (see Figs. 3 and 4,) and are preferably tapered or wedge-shaped in cross-section, as we find in practical operation that the wedge shape enables the tooth to enter the straw readily and without injuring the straw, and at the same time effectually clears the grain from the head, which almost invariably stands at an angle to the straw.

For thrashing grain the notched wedge-shaped tooth is sufficient; but for hulling clover and like small seeds the tooth should be ribbed or corrugated on its sides, (see Fig. 4,) and is used as will hereinafter more fully appear.

Beneath the thrashing-cylinder is a concave, $c^2$, which varies from those in common use in being devoid of teeth, the teeth of the cylinder doing all the work, and the concave simply serving to hold the grain up to the action of the cylinder and to direct it onto the carrier $d$. $d$ and $e$ indicate the usual or any approved straw-carriers, arranged as shown, and having an interposed beater, $f$, set over the chute or incline $g$, which directs the grain to the second cylinder, $h$. This beater $f$ is provided with a suitable pulley, preferably of such size as to cause the beater to run three or four times faster than the main thrashing-cylinder and carrier $d$, from which it is driven. This carrier $e$ delivers the straw from the machine, while the grain falls upon chute or incline $g$, and is conducted to the second cylinder.

$h$ indicates the second cylinder, whose function is to beat out the grain from the heads which have passed the first cylinder unbroken. This cylinder we arm with the notched or serrated and wedge-shaped teeth, preferably arranged in spirals, as before specified, and in conjunction therewith we use a concave, $i$, armed with a series of similar teeth, $j$, so set that the teeth of the cylinder play between them.

For hulling clover and like small seeds we find it desirable to change the teeth for the corrugated or ribbed teeth shown in Fig. 4, and in order to do so with facility we make the cylinder $h$ detachable. The concave $i$ may also be made detachable, if desired; but it is not necessary, as the teeth can be so constructed and arranged as to be readily removed and replaced by the corrugated teeth.

In thrashing grain the devices will operate as follows: Power being applied, and the thrashing-cylinders and feed-roll being revolved at the proportionate speeds specified, the grain, which will be laid on the chute or feed-board $a$ with the heads forward and the straw at right angles to the cylinder, will be gradually fed forward by the corrugated feed-roller. The teeth of the thrashing-cylinder, which revolve at greater speed than the feed-roll, will strike the grain, beating the same with a drawing, combing action, which, as the heads stand at an angle to the stalk, will separate the heads and work out the grain without breaking the straw. The straw and grain will then be taken by the carrier $d$ and conveyed forward. Most of the grain and the few heads which gather on or next to the carrier under the straw fall upon the incline and are conveyed to the second cylinder, $h$, while the straw passes over the beater onto the second carrier, $e$, which conducts it out of the machine.

The beater $f$ revolves rapidly and strikes and agitates the straw as it passes, causing it to yield such remaining grain, &c., as remains therein.

For hulling clover and the like small seeds the ribbed or corrugated teeth are inserted in the second cylinder and concave, as before specified, and the operation of the machine will be substantially as stated above, except that the heads which were separated from the stalk in the first cylinder will be subjected to the rubbing action of the corrugated faces of the teeth, and the seed will thereby be fully hulled by the teeth, which pass close to each other, without injury.

In our machine rye may be thrashed by inserting the ends in the range of the beating-cylinder, and when it is combed or beaten out the straw may be withdrawn without passing through the machine. This may be done without unbinding the sheaf.

In conjunction with our devices we have shown a fan, $m$, and we propose to use a vibrating shoe, screens, &c., common to this class of machines, but have not shown the same, as they are not essential to a comprehension of the case and form no part of the present invention.

The advantages of our invention are the perfect manner in which the thrashing is done without breaking the straw or injuring the grain, and the small amount of power required to operate the machine.

Having thus described the nature and advantages of our invention, what we claim, and desire to secure by Letters Patent, is—

1. The thrashing-machine tooth wedge-shaped in cross-section, with smooth sides, and notched or serrated upon its front edge, substantially as and for the purpose specified.

2. The combination of the corrugated feed-roll constructed substantially as described, and adapted to retard the grain, the thrashing-cylinder armed with teeth wedge-shaped in cross-section and serrated on the front edges, and a concave devoid of teeth, the thrashing-cylinder being geared to run at greater speed than the feed-rolls, the whole substantially as and for the purpose specified.

3. The combination, in a thrashing-machine, of two thrashing-cylinders armed with serrated teeth, wedge-shaped in cross-section, one cylinder provided with concave devoid of teeth, and the other cylinder having a concave provided with teeth like its cylinder, two or more straw-carriers, and an interposed beater, the whole relatively arranged substantially as and for the purpose specified.

4. The combination, in a thrashing-machine, of a cylinder provided with notched or serrated teeth, wedge-shaped in cross-section, and a plain concave, or one devoid of teeth, substantially as and for the purpose specified.

In testimony whereof, we, the said EDWIN R. JONES and JOHN W. GRUBBS, have hereunto set our hands.

EDWIN R. JONES.
JOHN W. GRUBBS.

Witnesses:
F. W. RITTER, Jr.,
T. B. KERR.